United States Patent [19]

Beall

[11] Patent Number: 5,567,318

[45] Date of Patent: Oct. 22, 1996

[54] METHOD OF REMOVING WATER-INSOLUBLE ORGANIC CONTAMINANTS FROM AN ACIDIC AQUEOUS STREAM

[75] Inventor: Gary W. Beall, McHenry, Ill.

[73] Assignee: AMCOL International Corporation, Arlington Heights, Ill.

[21] Appl. No.: 522,194

[22] Filed: Aug. 31, 1995

[51] Int. Cl.⁶ ........................................ C02F 1/28
[52] U.S. Cl. ............................ 210/691; 210/694
[58] Field of Search ........................ 210/690, 691, 210/692, 693, 694

[56] References Cited

U.S. PATENT DOCUMENTS

| | | | |
|---|---|---|---|
| 2,090,741 | 8/1937 | Zublin | 210/690 |
| 2,367,384 | 1/1945 | Tymstra et al. | 210/1 |
| 2,531,427 | 11/1950 | Hauser | 260/448 |
| 4,470,912 | 9/1984 | Beall | 210/691 |
| 4,473,477 | 9/1984 | Beall | 210/691 |
| 4,517,094 | 5/1985 | Beall | 210/664 |
| 4,549,966 | 10/1985 | Beall | 210/661 |

OTHER PUBLICATIONS

Technical Data Sheet, "An Introduction to Clarion," CETCO Publication No. GTM-100.

*Primary Examiner*—Cynthia L. Nessler
*Attorney, Agent, or Firm*—Marshall, O'Toole, Gerstein, Murray & Borun

[57] ABSTRACT

Hydrocarbons and other substantially water insoluble organic contaminants may be efficiently removed from a low pH aqueous wastewater stream by contacting the stream with a sorption medium comprising an organoclay, preferably in admixture with a diluent having a density similar to that of the clay. Surprisingly, the sorbent is not adversely affected by contact with the extremely low pH aqueous stream.

23 Claims, 1 Drawing Sheet

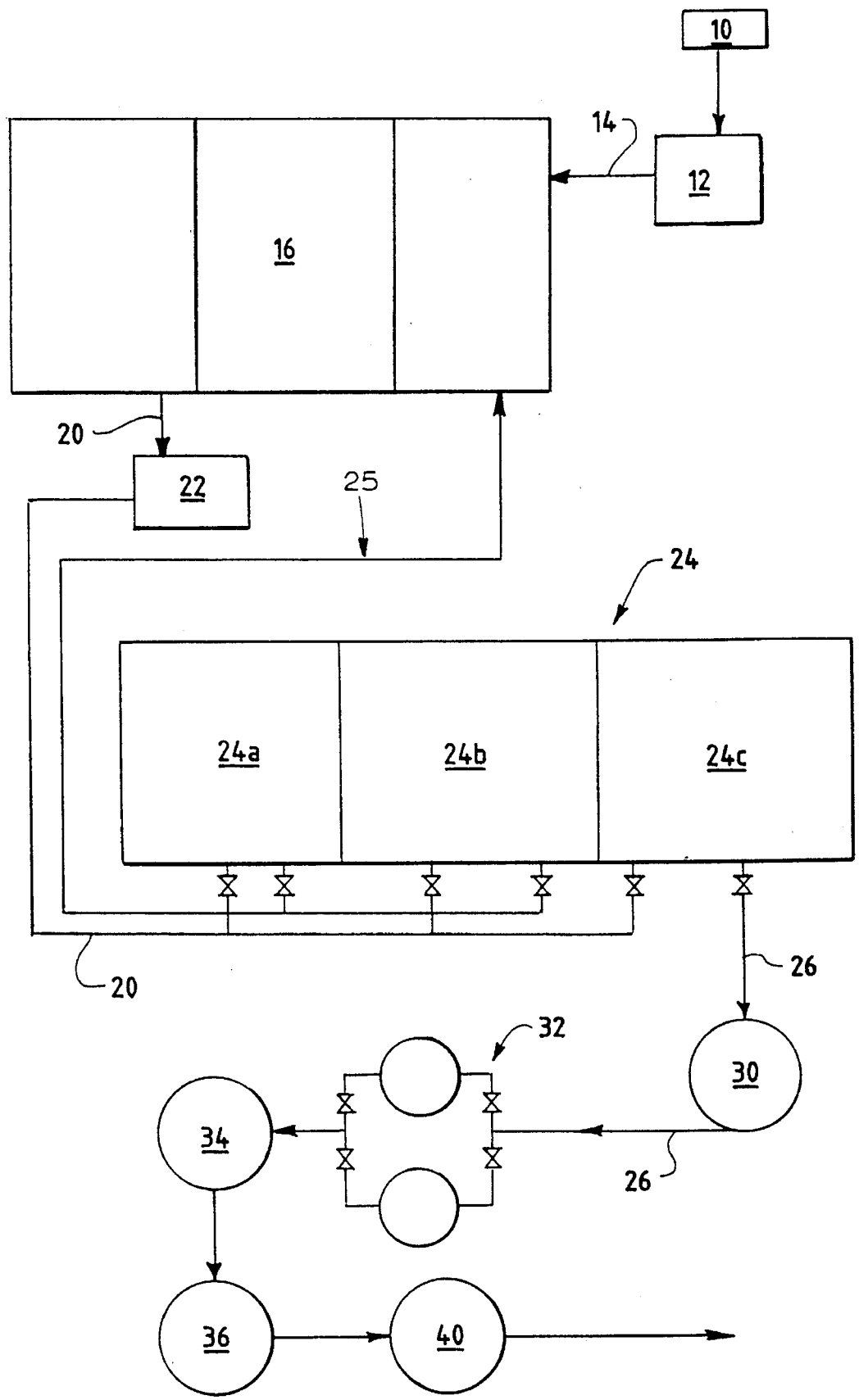

METHOD OF REMOVING WATER-INSOLUBLE ORGANIC CONTAMINANTS FROM AN ACIDIC AQUEOUS STREAM

BACKGROUND OF THE INVENTION

1. Field of the Invention

This invention relates generally to wastewater treatment and, more particularly, the invention relates to removal of water-insoluble organic contaminants such as oil and grease from wastewater streams.

2. Description of Related Technology

The decontamination of acidic streams such as waste streams containing substantial concentrations of oil and grease or other substantially water insoluble organic contaminants has long been a problem. While separation methods utilizing sorbents such as organophilic clays (sometimes referred to as "organoclays") have found great success in removing organic contaminants from aqueous waste streams, such methods have not been believed to be useful for use with highly acidic streams.

One commercially successful system for removing a wide variety of organic contaminants utilizes a sorbent comprising an organoclay, such as a previously prepared reaction product of a quaternary ammonium salt and a smectite-type clay, such as sodium bentonite, for example, generally by passing the contaminated stream through a packed or fluid bed of the sorbent.

Such clays are known to have a plate-like structure that selectively adsorbs low solubility organic compounds, causing the clay structure to swell to accommodate further adsorbed contaminants. Such sorbents are typically utilized in a mixture with a suitable diluent having a similar density, such as anthracite coal, to prevent premature caking of the bed and consequent breakthrough of the influent stream.

Such systems are described, for example, in Beall U.S. Pat. Nos. 4,473,477 (Sep. 25, 1984) and 4,549,966 (Oct. 29, 1985).

Beall U.S. Pat. No. 4,517,094 (May 14, 1985) teaches the utilization of a secondary separating means such as a packed bed of activated carbon and/or air stripping means for removing substantial quantities of low molecular weight components of the organic contaminants that may remain in the effluent from a primary sorption stage utilizing an organoclay sorbent.

Such systems have been utilized with great success in treating processor waste streams such as boiler feedwater, metal casting waste streams, effluents from wood treatment plants and electroplating or paint stripping installations, and others. However, organophilic clay sorbents have not been utilized for the removal of water-insoluble organic contaminants such as oil and grease from waste streams having very low pH levels. This prejudice in the art resulted from a belief that at a pH of about 3 or less acid present in such streams will attack exposed edges of the clay structure and leach out the aluminum octahedra of the clay, thus destroying the clay structure, leading to breakdown of the water treatment system.

This leaching of $Al^{+3}$ from clay is utilized commercially to produce a family of materials called bleaching earth. These materials are utilized in decoloring of vegetable oils. It is well known in the art that when these clays are acid activated the structure is so substantially altered that the interlaminar space is collapsed and is no longer accessible. Since the invention relies on this interlaminar space it was thought that such acid conditions would also render the organoclays ineffective.

One type of hydrocarbon-contaminated acid wastewater stream that requires removal of substantial quantities of contaminants is the acid wastewater return stream which is created by acid oil well refurbishment processes. In such processes, large amounts of strong acids, typically mixtures of hydrofluoric acid and hydrochloric acid, are utilized to refurbish oil well production lines, both offshore and onshore, on a periodic basis. The task of disposing of contaminated returns from such refurbishment processes has been a difficult one, which has met with only limited success. According to one prior art decontamination method, oil and grease are skimmed off the return stream by flotation, and the contaminated low pH effluent is then transported via pipeline to a dry well for burial. This procedure is no longer permissible, as governmental regulations strictly regulate the composition of acid waste streams that may be disposed of in the environment.

The acidic wastewater return streams generally have an extremely low pH of 3 or below, typically 2 or below, and often in the range of about 0 to 1.5. Such streams generally have oil and grease contaminant concentrations of at least about 200 ppm, generally in the range of about 10,000 ppm to about 20,000 ppm after gross separation of oil and grease by flotation, and may have oil and grease concentrations of up to 50 percent (or more) if flotation separation is not utilized.

The inability to effectively remove water-insoluble hydrocarbon contaminants from acidic wastewater returns has resulted in great effort and cost, as well as production downtime due to contamination entering production flow lines.

SUMMARY OF THE INVENTION

It is an object of the invention to overcome one or more of the problems described above.

According to the invention, substantially water insoluble organic contaminants, including hydrocarbons such as oil and grease, can be effectively removed from a very low pH aqueous influent stream containing such contaminants by contacting the stream with an organophilic clay whereby the contaminants are adsorbed by the clay to provide an aqueous effluent stream having a reduced concentration of contaminants relative to the influent stream, and separating the effluent stream from the clay and contaminants adsorbed thereon.

Further objects and advantages of the invention will be apparent to those skilled in the art from a review of the following detailed description taken in conjunction with the drawing and the appended claims.

BRIEF DESCRIPTION OF THE DRAWING

The sole figure is a schematic flow diagram depicting a process for removing oil and grease contaminants from an acidic wastewater return line from an oil well refurbishment process.

DETAILED DESCRIPTION OF THE INVENTION

The method of the invention may be applied to any aqueous stream, such as a waste stream, containing substantially water-insoluble organic contaminants, such as oil and grease or other hydrocarbon contaminants, for example, wherein the waste stream has a pH level of about 3 or below. The method of the invention is particularly useful in removing oil and grease from acidic wastewater returns from acid refurbishment processes used in oil well production lines.

The waste stream to be decontaminated may have a pH below about 3, and typically between about 1 and 2, although waste streams having a pH level below 1 (e.g., in the range of 0 to 1) may be successfully treated according to the invention.

Acid return streams from oil well refurbishment processes generally contain high concentrations of strong acids such as hydrofluoric acid and hydrochloric acid sufficient to maintain the pH of the water stream at very low levels. Such waste streams often contain high concentrations of oil and grease or other organic contaminants in the range of about 200 ppm or more, typically in the range of 10,000 ppm to about 20,000 ppm, and if gross amounts of contaminants have not been removed by flotation, up to about 50 weight percent or more.

Such waste streams may also contain relatively low molecular weight organic contaminants as well. Such contaminants may include, for example and without limitation, benzene, toluene, methyl chloride, chloroform, 1,2-dichloroethane, and others such as disclosed in Beall U.S. Pat. No. 4,517,094.

According to the invention, the stream to be treated is contacted with an organophilic clay whereby the contaminants are adsorbed by the clay to produce an aqueous effluent stream having a reduced concentration of contaminants relative to the influent stream, and separating the effluent stream from the clay and contaminants absorbed thereon. As detailed below, the organophilic clay is preferably the previously prepared reaction product of a quaternary ammonium salt and a smectite-type clay, such as a sodium bentonite clay, for example.

In a preferred embodiment, the influent stream is contacted with the organophilic clay by passing the influent stream through a mixture of the organophilic clay and a diluent, such as anthracite coal. If necessary or desired, the effluent stream may be further cleaned by removing low molecular weight organic contaminants by further separation means such as an activated carbon sorbent and/or air stripping means.

Organophilic Clay

The terms "organophilic clay" and "organoclay" are used herein interchangeably to refer to various types of clay, e.g., smectites, that have organoammonium ions substituted for cations between the clay layers. The term "organoammonium ion substituted" refers to a substituted ammonium ion in which one or more hydrogen atoms are replaced by an organic group. The organoclays are essentially solid compounds that have an inorganic and an organic phase.

The preferred clay substrates for use in this invention are the smectite-type clays, particularly the smectite-type clays that have a cation exchange capacity of at least 75 milliequivalents per 100 grams of clay. Useful clays for such purposed include the naturally occurring Wyoming variety of swelling bentonite and similar clays, and hectorite, which is a selling magnesium-lithium silicate clay. The clays are preferably converted to the sodium form if they are not already in this form. This can be effected by a cation exchange reaction with a soluble sodium compound. These methods are well-known in the art. Smectite-type clays prepared synthetically can also be utilized, such as montmorillonite, bentonite, beidelite, hectorite, saponite, and stevensite.

The organoclays useful in this invention also include those set forth in U.S. Pat. No. 2,531,427 to Hauser. These organoclays are modified clays which exhibit in organic liquid, some of those characteristics that untreated clays exhibit in water. For example, they will swell in many organic liquids and will form stable gels and colloidal dispersions.

Generally, the quaternary ammonium salt substituted onto the clay has organic groups attached to the clay that will range from aliphatic hydrocarbon of from 1 to 24 carbons to aromatic organic molecules, such as benzyl groups that could have a host of groups substituted on the benzyl ring. The number of benzyl versus straight chain hydrocarbons substituted on the ammonium ion can vary from 3 to 0 (i.e., dimethyl dioctododecyl 0:2, methyl benzyl dioctododecyl 1:2, dibenzyl dioctobenzyl 1:1, tribenzyl octadecyl 3:1, and methyl dibenzyl octodecyl 2:1). The amount of alkyl ammonium salt substituted on the clay can vary between 0.5% to 50%.

One organoclay useful in the invention comprises one or more of the following type of quaternary ammonium cation modified montmorillonite clays:

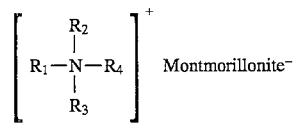

wherein $R_1$ is an alkyl group having at least 10 carbon atoms and up to, for example, 24 atoms, and preferably having a chain length of from 12 to 18 carbon atoms; $R_2$ is hydrogen, benzyl, or an alkyl group of at least 10 carbon atoms and up to, for example, 24 carbon atoms, and preferably from 12 to 18 carbon atoms; and $R_3$ and $R_4$ are each hydrogen or lower alkyl groups, i.e., they contain carbon chains of from 1 to 4 atoms, and preferably are methyl groups.

Other organoclays utilizable in the invention include benzyl organoclays such as dimethyl benzyl (hydrogenated tallow) ammonium bentonite; methyl benzyl di(hydrogenated tallow) ammonium bentonite; and more generally quaternary ammonium cation modified montmorillonite clays represented by the formula:

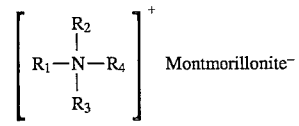

wherein $R_1$ is $CH_3$ or $C_6H_5CH_2$; $R_2$ is $C_6H_5CH_2$; and $R_3$ and $R_4$ are alkyl groups containing long chain alkyl radicals having 14 to 22 carbon atoms, and most preferably wherein 20% to 35% of said long chain alkyl radicals contain 16 carbon atoms and 60% to 75% of said long chain alkyl radicals contain 18 carbon atoms.

The montmorillonite clays that may be so modified are the principal constituents of bentonite rock, and have the chemical compositions and characteristics described, for example, in Berry & Mason, "Mineralogy," 1959, pp. 508–509. Modified montmorillonite clays of this type (i.e., organoclays) are commercially available from Southern Clay Products, Inc., Gonzales, Tex. under such trade designations as CLAYTONE 34 and 40, and are available from NL Industries, Inc., New York, N.Y. under such trade designations as BENTONE 27, 34, and 38. Other organoclays useful in the invention are the higher dialkyl dimethyl ammonium organoclays such as dimethyl di(hydrogenated tallow) ammonium bentonite; the benzyl ammonium organoclays, such as dimethyl benzyl (hydrogenerated tallow) ammonium bentonite; and ethylhydroxy ammonium organoclays such as methyl bis (2-hydroxyethyl) octodecyl ammonium bentonite.

As is well-known in the art, organoclay sorbents are advantageously utilized in admixture with a diluent having a similar density. A widely used and preferred diluent is anthracite coal. The diluent has the function of separating clay granules from each other in order to maximize the swelling capability thereof, thus maximizing the sorption capacity of the clay.

Typically, a homogenous mixture of clay and anthracite coal or other diluent comprises 30 to 60 weight percent clay, and corresponding with to 70 to 40 weight percent diluent. Preferably, the mixture contains about 30 to about 40 weight percent clay and correspondingly about 70 to about 60 weight percent coal. A typical mixture may contain about 35 weight percent clay and about 65 weight percent coal.

Secondary Separation Means

As described in detail in Beall U.S. Pat. No. 4,517,094 (May 14, 1985), a secondary separation means such as a stripping means, activated carbon, or combinations thereof may be utilized to separate relatively low molecular weight organic contaminants from an aqueous effluent stream from which substantial quantities of oil and grease have been removed by sorption with an organophilic clay. Such secondary separation means may be advantageously utilized in accordance with the present invention where the aqueous stream to be treated contains such materials and substantial quantities thereof remain in the effluent stream from the sorption step.

Contaminant Separation Procedure

With reference to an acid wastewater return stream from an acid oil well production line refurbishment process, it is generally possible to remove major portions of water-insoluble organic contaminants from the water return stream by flotation. This may be accomplished by any suitable means, such as by stagewise flotation using compartmented tanks. The recovered oil from the flotation step may be returned to the oil well production line. The remaining, aqueous fraction is then preferably subjected to filtration to remove suspended solids before the sorption step. The water stream is contacted with the clay or clay/diluent sorbent in single or multiple stages, as necessary, and optionally may be subjected to secondary separation to remove low molecular weight contaminants.

After testing the effluent from the final contaminant separation stage, the effluent may be discharged. For example, in an offshore drilling operation, clean water may be discharged overboard from the production installation.

A typical acid return wastewater clean-up process according to the invention will be described below with reference to the drawing.

The figure schematically represents a process according to the invention for removing oil and grease from contaminated acid waste streams from an acid oil well production line refurbishment process. As schematically illustrated, acid is supplied from a source 10 to a well 12, and a water return stream 14 containing high concentrations of oil and grease and acid at low pH is directed to a three-compartment phase separation tank 16. Crude oil contaminants are recycled from this tank to the production pipeline (not shown). The remaining aqueous return stream 20 is then pumped, illustratively by means of a high-pressure diesel pump 22 to a flotation tank generally designated 24 having three-compartments 24a, 24b, and 24c and including weirs and valving to allow recycle of skimmed recovered oil to the main flotation tank through a line 25.

Contaminated water is then pumped from the compartment 24c through a line 26 by means of a centrifugal diesel pump 30 to a dual sock (i.e., bag) filter generally designated 32 to remove suspended solids. The filtered stream is then directed to two adsorption towers 34 and 36, each containing an organoclay/anthracite coal mixture adsorption medium. The two columns 34 and 36 are connected in series. The effluent from the second absorption column 36 is then optionally directed through an adsorption column containing activated carbon (not shown) and to a sample tank 40 for testing prior discharge to the environment. The carbon column is used only when solvents such as xylene are being employed.

The bag filter 32 generally removes suspended particulates greater than 25 microns in size, for example, which could otherwise cause premature blinding of the sorption column. The downwardly directed flow of the stream through the adsorption towers 34 and 36 allows oil to rise to the top of the column rather than infiltrating into and plugging the column.

The sorption columns 34 and 36 are operated until effluent monitors indicate that breakthrough of contaminants have been achieved or until a satisfactorily low pressure drop can no longer be sustained. At this point, the clay sorption medium is removed from each column and replaced. Spent sorption medium may be disposed of in a landfill or burned since it typically has a high BTU value.

The sorption medium may be periodically backwashed with water to remove fine particles entrapped therein. Backwashing does not result in desorption of organic contaminants, and the backwash water may therefor be safely disposed of. Backwashing also removes entrained air, an excess of which may reduce system efficiency as well as any residual alcohol which may have been used during production of the organoclay sorbent. Backwashing also has the advantage of fluidizing the sorption medium bed. After backwashing is complete, the bed settles in a uniform mixture, because the densities of anthracite coal and the organoclay sorbent are nearly identical. Thus, the medium does not stratify, and original pressure drop characteristics are restored.

EXAMPLE

The following working example will illustrate the practice of the invention.

The method of the invention was applied to acid wastewater streams from an oil well acid refurbishment process conducted on an offshore oil well production installation in the Gulf of Mexico utilizing the process depicted in the figure. Acid wastewater returns at a pH generally in the range of 0.5 to 1.5 were pumped from the oil well to a primary phase separation tank 16, and from there to a three-compartment 100 barrel secondary flotation tank 24 for phase separation. (Compartment 24a was 20 barrels in size, and compartments 24b and 24c were each 40 barrels in size.) Oil skimmed off in the secondary tank 24 was pumped back to the primary tank 16 and into the producer's pipeline, and contaminated water was pumped through a 25 micron dual-sock filter 32 to remove suspended solids. The influent stream was then directed through two adsorption towers 34 and 36 each containing 750 pounds of a 30 weight percent clay/70 weight percent anthracite coal adsorption medium. The clay was a montmorillonite clay modified with dimethyl ditallow quaternary ammonium. The effluent from the second adsorption tower 36 was directed through an adsorber (not shown) containing 500 pounds activated carbon. The effluent therefrom was then directed to a sample tank 40 for testing and was released overboard. (Effluent containing less than 29 ppm contaminant was considered acceptable for discharge into the sea.)

The influent (post flotation) and effluent streams were tested gravimetrically to identify the concentration of all components both before and after exposure to silica gel, which removes surfactants. (The post silica gel measurement is considered a truer test of contaminant concentration.) The influent and effluent streams were also tested by means of infrared radiation both with and without silica gel treatment to measure oil and grease concentration.

Testing methods included EPA 413.1, 413.2, and 418.1.

Results are show in Table 1, below.

TABLE 1

| Sample | Gravimetric (mg/l) | Gravimetric (Silica) (mg/l) | IR (mg/l) | IR (Silica) (mg/l) |
| --- | --- | --- | --- | --- |
| Influent A | 33,000 | | | |
| Effluent A | 50± | 40 | 92 | 85 |
| Influent B | 267 | 216 | 810 | 410 |
| Effluent B | <1 | <1 | <1 | <1 |
| Influent C | 567,000 | | | |
| Effluent C | 11 | 3 | 61 | 8 |

The pH levels of two sets of influent and effluent streams were also tested, and are shown in Table 2, below.

TABLE 2

| SAMPLE | pH |
| --- | --- |
| Influent D | 1.09 |
| Effluent D | 1.09 |
| Influent E | 0.82 |
| Effluent E | 0.84 |

It has been found that the pH of the aqueous streams may not be substantially affected by the sorption step, which indicates that surprisingly little or no attack of the clay sorption mediums occurs during the sorption step.

It is theorized that the organophilic clay is coated by the hydrocarbons present in the stream on the exposed surfaces of the clay structure, thus protecting the clay from leaching by the acid present in the waste stream.

The foregoing detailed description is given for clearness of understanding only, and no unnecessary limitations should be understood therefrom, as modifications within the scope of the invention may become apparent to those skilled in the art.

I claim:

1. A method of removing substantially water-insoluble organic contaminants from an aqueous oil-containing influent stream containing such contaminants and having a pH of about 3 or less, said method comprising the steps of:
   (a) contacting said influent stream and said oil with an organophilic clay whereby said contaminants are adsorbed by said clay to produce an aqueous effluent stream having a reduced concentration of said contaminants relative to said influent stream; and
   (b) separating said effluent stream from said clay and contaminants adsorbed thereon.

2. The method of claim 1 wherein the pH of said influent stream is about 2 or less.

3. The method of claim 1 wherein said influent stream comprises an acid wastewater return stream from an oil well refurbishment process.

4. The method of claim 3 wherein said influent stream contains greater than about 200 ppm crude oil contaminants prior to contact with said organophilic clay and sufficient strong acid selected from the group consisting of hydrofluoric acid and hydrochloric acid and mixtures thereof to maintain the pH of said stream at about 3 or less.

5. The method of claim 1 wherein said organophilic clay is a previously prepared reaction product of a quaternary ammonium salt and a smectite-type clay.

6. The method of claim 5 wherein said clay is a bentonite clay.

7. The method of claim 1 wherein said influent stream is contacted with said organophilic clay by passing said influent stream through a mixture of said organophilic clay and a diluent.

8. The method of claim 7 wherein said influent stream is passed downwardly through a bed of said organophilic clay/diluent mixture.

9. The method of claim 7 wherein said organophilic clay is a reaction product of a quaternary ammonium salt and a smectite-type clay and said diluent is anthracite coal.

10. The method of claim 9 wherein said mixture comprises about 30 to about 60 weight percent organophilic clay and about 70 to about 40 weight percent anthracite coal, for a total of 100 percent.

11. The method of claim 10 wherein said mixture comprises about 30 to 40 weight percent organophilic clay and about 70 to about 60 weight percent anthracite coal, for a total of 100 percent.

12. The method of claim 7 wherein said effluent stream is passed through further separating means for separating additional organic contaminants, said further separating means being selected from the group consisting of activated carbon, air stripping means, and combinations thereof.

13. The method of claim 12 wherein said further separating means comprises a bed packed with porous activated carbon.

14. The method of claim 13 wherein said carbon comprises granulated activated charcoal.

15. A method of removing substantially water-insoluble organic contaminants from an aqueous acid wastewater stream from an oil well refurbishment process, said acid wastewater stream having a pH of about 3 or less, said method comprising the steps of:
   (a) contacting said acid wastewater stream with an organophilic clay whereby said organic contaminants are adsorbed by said clay to produce an aqueous effluent stream having a reduced concentration of said contaminants relative to said acid wastewater stream; and
   (b) separating said effluent stream from said clay and contaminants adsorbed thereon.

16. The method of claim 15 wherein said acid wastewater stream contains greater than about 200 ppm crude oil contaminants prior to contact with said organophilic clay.

17. The method of claim 15 wherein the pH of said influent stream is about 2 or less.

18. The method of claim 15 wherein said organoclay is a reaction product of a bentonite clay with a quaternary ammonium ion.

19. The method of claim 15, wherein said acid wastewater stream is contacted with said organophilic clay by passing said acid wastewater stream through a mixture of said organophilic clay and a diluent.

20. The method of claim 19 wherein said organophilic clay is a reaction product of a quaternary ammonium salt and a smectite-type clay and said diluent is anthracite coal.

21. The method of claim 20 wherein said mixture comprises about 30 to about 60 weight percent organophilic clay and about 70 to about 40 weight percent anthracite coal, for a total of 100 percent.

22. The method of claim 21 wherein said mixture comprises about 30 to 40 weight percent organophilic clay and about 70 to about 60 weight percent anthracite coal, for a total of 100 percent.

23. The method of claim 19 wherein said effluent stream is passed through further separating means for separating additional organic contaminants, said further separating means being selected from the group consisting of activated carbon, air stripping means, and combinations thereof.

* * * * *

UNITED STATES PATENT AND TRADEMARK OFFICE
CERTIFICATE OF CORRECTION

Page 1 of 2

PATENT NO. : 5,567,318
DATED : OCTOBER 22, 1996
INVENTORS : BEALL et al.

It is certified that error appears in the above-identified patent and that said Letters Patent is hereby corrected as shown below:

Cover Page, at [75], insert the following coinventor -- Michael R. Johnson, Mandeville, La. --

Column 1, line 62, delete "$Al^{+3}$" and substitute therefor -- $Al^{+3}$ --.

Column 4, line 45, delete

UNITED STATES PATENT AND TRADEMARK OFFICE
CERTIFICATE OF CORRECTION

PATENT NO. : 5,567,318
DATED : October 22, 1996
INVENTOR(S) : Beall et al.

It is certified that error appears in the above-identified patent and that said Letters Patent is hereby corrected as shown below:

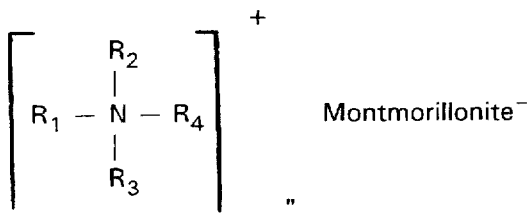

and substitute therefor

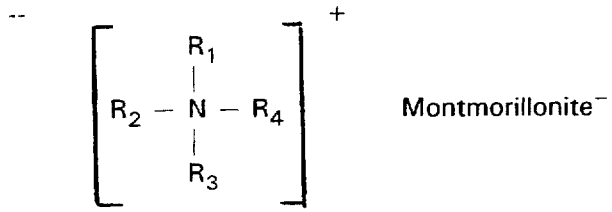

Signed and Sealed this

Eighth Day of June, 1999

Attest:

Attesting Officer

Q. TODD DICKINSON

Acting Commissioner of Patents and Trademarks

UNITED STATES PATENT AND TRADEMARK OFFICE
Certificate

Patent No. 5,567,318                                                  Patented: October 22, 1996

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Gary W. Beall, McHenry, II; and Michael R. Johnson, Mandeville, LA.

Signed and Sealed this Twenty-Ninth Day of June, 1999.

DAVID L. LACEY
*Supervisory Patent Examiner*
Art Unit 1761